Nov. 5, 1935.  J. E. PADGETT  2,020,122
SEALING STRUCTURE
Filed May 31, 1933

INVENTOR:
JOSEPH E. PADGETT
Kwis Hudson & Kent
ATTORNEYS

Patented Nov. 5, 1935

2,020,122

UNITED STATES PATENT OFFICE 2,020,122

SEALING STRUCTURE

Joseph E. Padgett, Toledo, Ohio

Application May 31, 1933, Serial No. 673,586

2 Claims. (Cl. 286—26)

This invention relates to fluid leakage preventing means and, more particularly, to an improved shaft seal embodying a packing having an axially elongated tapered portion through which the shaft extends and wherein such tapered portion is provided with a relatively sharp edge which is pressed against the shaft.

Shaft sealing devices have been proposed heretofore which were provided with a packing having an axially elongated portion through which the shaft extended, but in those proposed devices the packing had a relatively long contact area with the shaft. In my improved seal, only the relatively sharp edge of the packing contacts with the shaft and this constitutes only a relatively small or narrow contact area as compared with the sealing devices heretofore proposed. Since these proposed prior devices had a relatively long contact area and did not have a relatively sharp edge pressed against the shaft as in my invention, the film of oil or other fluid on the shaft surface would enter between the edge of the packing and the shaft, and because of its cohesion, the film of fluid caused the packing to be pushed away from the shaft with the result that, once started, a constant seepage of fluid would take place through the seal. In my improved seal, as will be explained more fully hereinafter, the sharp edge of the packing being pressed against the shaft as a relatively small contact area, cuts through the film and entry of fluid between the shaft and packing is entirely prevented.

It is, therefore, an object of the present invention to provide a compact and efficient sealing structure embodying an elongated packing having a relatively sharp edge adapted to be pressed against a shaft extending through the packing, and wherein the packing is such that the section thereof which contacts with the shaft is relatively narrow in the direction of the axis of the shaft while other portions of the packing are spaced from the surface of the shaft.

Another object of the invention is to provide an improved sealing structure embodying a sheet metal shell, and a packing having a radial flange disposed in the shell and an elongated tapered sleeve portion through which a shaft is adapted to extend, and wherein the sleeve portion is provided at its free end with a relatively sharp edge adapted to be pressed against the shaft.

Still another object of the invention is to provide an improved sealing structure, of the type referred to, wherein the sharp edge of the sleeve portion of the packing is scrapingly pressed against a reciprocable shaft extending through the packing by means including an angularly disposed annular surface engaging the sleeve portion.

A further object of the invention is to provide an improved sealing structure, of the type referred to, wherein the narrow contact portion or edge of the elongated packing is scrapingly pressed against a reciprocable shaft by a member normally biased toward the packing and having a substantially frusto-conical portion engaging the free end of the packing.

Other objects and advantages of the invention will be apparent from the following description when taken in conjunction with the accompanying sheet of drawings wherein Fig. 1 is an outside elevational view showing a device embodying my improved sealing structure;

Figure 2:
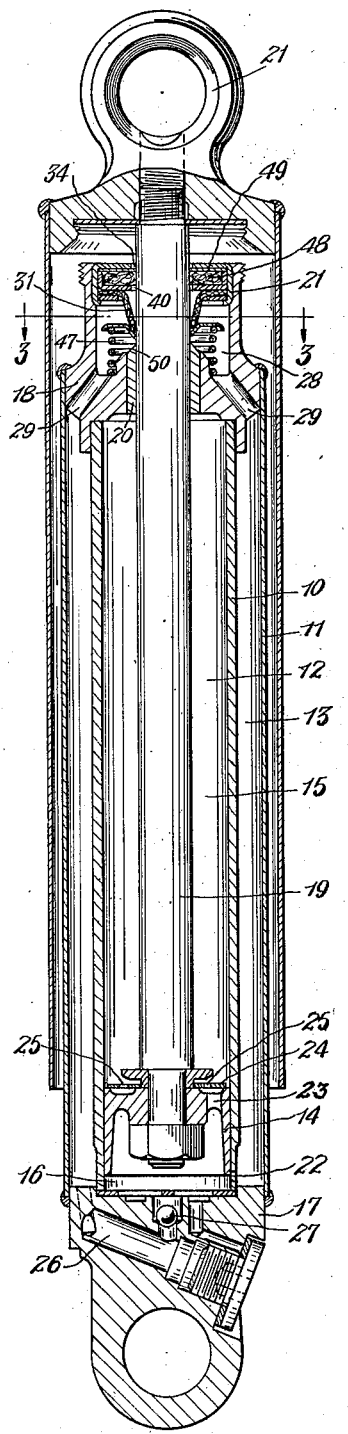
Fig. 2 is a longitudinal sectional elevation taken through the device substantially as indicated by line 2—2 of Fig. 1.
Figure 4:
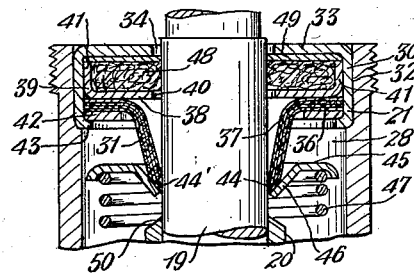
Fig. 4 is a sectional view on an enlarged scale, further illustrating the construction of my improved sealing means.
Figure 3:
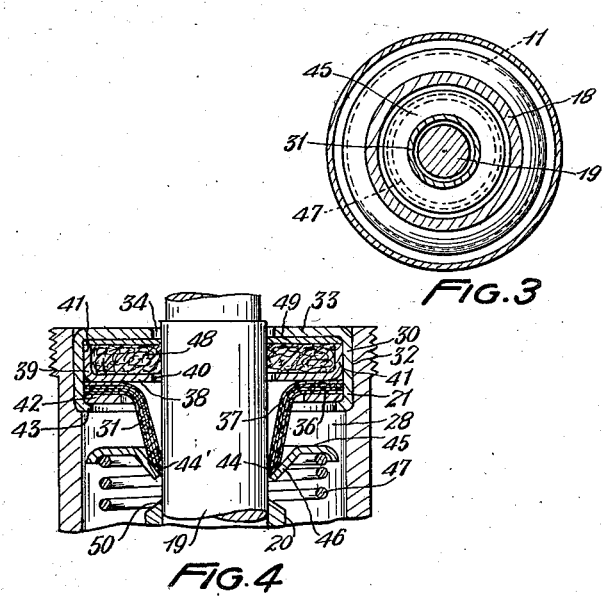
Fig. 3 is a transverse sectional view taken through the sealing structure as indicated by line 3—3 of Fig. 2.
Figure 1:
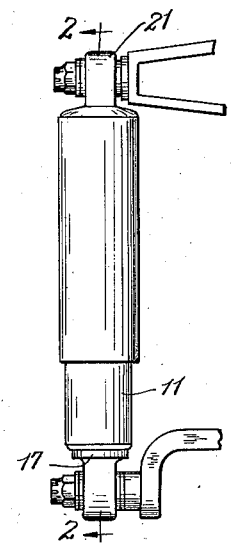

In the accompanying drawing, to which more detailed reference will now be made, I have shown improved sealing means for preventing fluid leakage around a shaft, and although I have illustrated my improved sealing means as being embodied in a shock absorbing device, it should be understood, however, that this improved sealing means has general utility and that it may be embodied in numerous other machines and devices.

As stated above, the improved sealing structure of my invention is illustrated as forming a part of a shock absorbing device and, before proceeding with a detailed description of the sealing structure, I shall describe briefly the construction and operation of the shock absorber. The shock absorber herein illustrated is of the direct acting type and comprises barrels 10 and 11 arranged in coaxial relation to provide a working cylinder 12 and a reservoir chamber 13, and a piston 14 which is reciprocable in the working cylinder and which divides the latter into upper and lower chambers 15 and 16. The cylinder and reservoir barrels are closed at their upper and lower ends by the respective plug members 18 and 17. A piston rod or shaft 19, extending into the working cylinder through the plug member 18, is connected at its lower end to the piston 14. This shaft is slidable in a bearing sleeve 20 mounted in the plug member 18, and extends through the sealing structure 21 which is mounted in the plug member outwardly of the bearing 20 and which is to be described more fully hereinafter.

The chamber 16 of the working cylinder is in continuous communication with the reservoir adjacent the lower end of the latter through one or more restricted openings 22 extending through the wall of the barrel 10. The piston is provided with one or more passages 23 for a transfer of fluid therethrough and with a valve plate 24 which acts as a check valve for controlling the flow of fluid through the piston passage. During the downward or compression stroke of the piston some of the fluid in the working cylinder below the piston is displaced into the reservoir through the openings 22 and another portion of the body of fluid passes upwardly through this piston passage 23 and into the upper chamber 15, thereby unseating the valve plate 24. During the upward or rebound stroke of the piston the valve plate 24 is seated against the body of the piston and a portion of the fluid contained in the chamber 15 is forced downwardly through the restricted orifice 25 of the valve plate to produce a desired shock absorbing action. During this upward stroke of the piston, fluid returns to the lower chamber 16 from the reservoir through the restricted opening 22 and also through the by-pass 26 which is controlled by the check valve ball 27. During the downward stroke of the piston the ball 27 is seated to close the by-pass and a desired shock absorbing action, due to the flow of fluid through the opening 22 and upwardly past the valve plate 24, can be obtained.

Since the upward travel of the piston subjects the fluid, which is above the piston, to pressure, some of this fluid may escape through the bearing 20. This escaping fluid is collected in the chamber 28 and is returned to the reservoir through the drain passages 29. Loss of this fluid which passes through the bearing 20, is prevented by my improved sealing structure 21 which will now be described.

This improved sealing structure comprises a cage or shell 30 through which the shaft 19 extends, and a packing 31 carried by the cage for cooperation with the shaft. The cage may be of any appropriate shape and is here shown as a cup-shaped sheet metal shell having a substantially cylindrical outer wall or rim 32 engaging in the recess 28, and a substantially radially disposed end wall 33 which has a central opening 34 through which the shaft extends. The packing is preferably formed of leather, but may be of any other suitable material, and has a substantially radially outwardly extending flange portion 36 which is disposed in the hollow cage and an axially extending elongated tapered sleeve portion 37 which projects from the cage in the direction of the shaft and extends inwardly of the recess 28 toward the bearing 20.

The radially extending flange portion 36 of the packing engages the radially extending wall 38 of a cup-shaped spacer member 39 which is also disposed in the hollow cage. This spacer may also be formed of sheet metal and is provided with an opening 40 through the wall 38 to accommodate the shaft 19 and has a substantially cylindrical outer rim portion 41 which extends toward the radially extending wall 33 of the cage. A washer 42 disposed around the shaft is arranged to clamp the radially extending flange portion of the packing against the radially extending wall 38 of the spacer. This washer also forms a closure for the inner end of the cage and may be retained in the cage by the latter being spun or deflected inwardly around the outer edge of the washer, as indicated at 43.

As an important feature of my invention, the tapered sleeve portion of the flexible packing is provided at the small or inner end thereof with a relatively sharp edge 44 which is adapted to be pressed against the shaft 19, and which cuts through the film of fluid clinging to the surface of the shaft so as to prevent any of such fluid from entering between the packing and the shaft. As shown in the drawing, the packing is arranged so that the tapered sleeve portion thereof contacts with the shaft throughout an annular area or section 44' which is relatively narrow in the direction of the axis of the shaft and which terminates in the sharp edge 44. All other portions of the packing are spaced from the surface of the shaft. For pressing the narrow contact portion 44' and its sharp edge 44 against the surface of the shaft 19, I employ a member 45, preferably in the form of a washer, which is shiftable in the direction of the axis of the shaft and is normally biased toward the hollow cage. To enable the washer to exert a localized pressing action against the sharp inner edge of the tapered sleeve portion, I provide the washer 45 with an angularly disposed annular portion 46 which is substantially frusto-conical in shape. An opening provided in this frusto-conical portion of the washer accommodates the shaft with enough clearance to permit free movement of the shaft therein but insufficient to permit the packing from protruding through the opening. In this instance, the washer 45 is biased toward the hollow cage by means of a coil spring 47 which is disposed around the shaft with one end in engagement with the washer and the other end engaging the bottom wall of the recess 28.

From the arrangement just described, it will be seen that because of the action of the spring 47 in biasing the washer 45 toward the hollow cage, the frusto-conical portion 46 of the washer will press or wedge the inner end of the sleeve portion of the packing into scraping engagement with the shaft 19 while other portions of the packing remain in spaced relation to the surface of the shaft. As the result of this scraping engagement between the packing and the shaft, the sharp edge 44 is caused to cut through the film of liquid clinging to the surface of the shaft and such liquid will be scraped therefrom during the outward movement of the shaft. The pressing of the sharp edge against the surface of the shaft thus prevents any of the film of fluid from entering between the shaft and the leading edge of the packing. Since the spring continuously biases the washer toward the cage, the inner end of the tapered portion of the packing will always be firmly pressed against the shaft even though the packing becomes considerably worn, and thus the spring and washer also constitute a wear take-up means. With the arrangement of tapered packing and the frusto-conical spring pressed washer which has been described, it will be seen that the sharp edge of the packing will always be pressed against the shaft as a relatively narrow contact area, and that even though wear occurs, the area of contact between the packing and the shaft remains relatively narrow and the efficient sealing action is maintained. Moreover, the use of a coil spring for pressing the sharp edge of the packing against the shaft allows considerable wear to take place in the packing with only a slight change occurring in the spring pressure. Thus the sharp edge of the packing is always pressed against the shaft with a desirable, substantially uniform pressure.

With the spacer 39 disposed in the hollow cage as shown in the drawing, a recess or chamber is provided between the wall 38 of the spacer and the end wall 33 of the cage. If desired, a second packing 48 of suitable nature may be disposed around the shaft in this recess. This second packing may comprise a body of fibrous material, such as felt, or may be formed of any other suitable packing material. The use of this second packing is not necessary for the attainment of the improved and beneficial sealing action described above for the flexible packing 31, although it is desirable to employ such a second packing to prevent dust, water, or other foreign material, from entering the seal around the shaft. If desired, a third packing element 49, such as a disk of fibrous or other suitable material, may be arranged around the shaft between the spacer 39 and the end wall 33 of the cage. This packing element produces a fluid seal between the rim of the spacer and the end wall 33, and also serves further to exclude foreign material and to prevent the fibrous packing material from working out of the cage between the shaft and the edge of the opening 34.

As explained above, the scraping action exercised by the inner end of the flexible packing 31 removes fluid from the surface of the shaft and this fluid collects in the chamber 28 from whence it returns to the reservoir through the passages 29. To facilitate the flow of this fluid away from the piston rod, I construct the bearing 20 with a tapered outer end surface 50 which, as shown in the drawing, extends toward the tapered sleeve portion of the packing. This tapered surface of the bearing facilitates the flow of fluid away from the shaft, thereby preventing the fluid, which is scraped from the shaft by the packing, from piling up against the inner end of the packing. In addition, the tapered end surface of the bearing tends to cause fluid to be scraped from the shaft as the latter moves inwardly into the cylinder.

From the foregoing description and the accompanying drawing it will now be readily understood that I have provided a compact and very efficient form of seal for preventing fluid leakage around a shaft. Moreover, it will be seen that since the axially elongated portion of the flexible packing contacts with the surface of the shaft only at the extreme inner edge of the packing, the area of contact between the packing and the shaft is a very narrow annular contact area and, with this narrow area scrapingly pressed against the shaft by the washer which is biased toward the packing, a very efficient sealing action is produced.

While I have illustrated and described my improved sealing structure in a detailed manner and have disclosed the same in connection with a shock absorbing device, it should be understood, however, that my improved sealing structure may be applied to various kinds of apparatus, and that I do not wish to be limited to the precise details of construction and arrangement of parts herein disclosed but regard my invention as including such changes and modifications as do not involve a departure from the spirit of the invention and the scope of the appended claims.

Having thus described my invention, I claim:

1. In a sealing structure of the character described the combination of a body having a recess therein, a reciprocable shaft extending into said recess, a shell disposed in said recess and having an opening through which said shaft extends, a flexible non-metallic packing having a flange portion retained in said shell and a tapered sleeve portion extending inwardly from the shell around said shaft, said sleeve portion having contact with said shaft only along an annularly extending edge of the extreme inner end of such sleeve portion, a bearing for the shaft inwardly of said packing, said bearing having a tapered portion extending toward the tapered sleeve portion of the packing, and a member having a substantially frusto-conical portion normally biased toward the shell for pressing said edge of the packing against the shaft.

2. In a sealing structure of the character described the combination of a body having an opening therein, a bearing on said body and having a portion extending into said opening, a reciprocable shaft extending into the opening and bearing, a shell disposed in said recess and having an opening through which said shaft extends, a packing retained in said shell and having a tapered sleeve portion extending inwardly from the shell around said shaft with the extreme inner end only of the packing engaging the shaft, and means for scrapingly pressing said inner end of the packing against the shaft, the outer end of said bearing being tapered oppositely to the taper of the sleeve portion of the packing.

JOSEPH E. PADGETT.